United States Patent [19]

Prietzel et al.

[11] Patent Number: 4,768,132
[45] Date of Patent: Aug. 30, 1988

[54] DISCONNECT CONTACT ARRANGEMENT FOR SWITCHGEAR MOVABLY ARRANGED AT GUIDES

[75] Inventors: Günter Prietzel; Rosemarie Schultz, both of Berlin, Fed. Rep. of Germany

[73] Assignee: Siemens Aktiengesellschaft, Berlin & Munich, Fed. Rep. of Germany

[21] Appl. No.: 935,041

[22] Filed: Nov. 26, 1986

[30] Foreign Application Priority Data

Nov. 29, 1985 [DE] Fed. Rep. of Germany ....... 3542747

[51] Int. Cl.$^4$ ............................................. H02B 1/04
[52] U.S. Cl. .................................. 361/342; 361/337; 361/391; 439/716
[58] Field of Search ............ 339/255 P, 198 N, 22 B; 200/50 AA, 255, 282; 361/335, 336, 337, 338, 339, 341, 342, 355, 390, 391, 426, 425, 429; 439/709, 710, 715, 716

[56] References Cited

U.S. PATENT DOCUMENTS

| | | | |
|---|---|---|---|
| 1,885,365 | 11/1932 | MacNeil | 361/337 |
| 2,015,710 | 10/1935 | Cornell et al. | 173/332 |
| 2,128,149 | 8/1938 | Linde | 361/337 |
| 2,647,247 | 7/1953 | Fulton et al. | 339/214 |
| 3,308,348 | 3/1967 | Olashaw | 361/342 |
| 3,999,830 | 12/1976 | Herrmann, Jr. et al. | 339/136 |
| 4,031,433 | 6/1977 | Olashaw | 361/338 |
| 4,242,718 | 12/1980 | Shariff | 361/342 |
| 4,486,636 | 12/1984 | Prietzel | 200/255 |

FOREIGN PATENT DOCUMENTS

| | | |
|---|---|---|
| 1065389 | 5/1954 | France . |
| 641506 | 8/1950 | United Kingdom . |
| 2126790 | 3/1984 | United Kingdom ................ 361/342 |

Primary Examiner—G. P. Tolin
Attorney, Agent, or Firm—Kenyon & Kenyon

[57] ABSTRACT

A disconnect (break) contact arrangement has disconnect contact blocks which are arranged between two support bars which are common to the disconnect contact block for one pole of the switchgear. Inner clamping pieces seize projections of the disconnect contact block, while outer clamping pieces serve for fastening a conductor section engaging the disconnect contact blocks. If two or more disconnect contact blocks per terminal of a switchgear are required, these are arranged likewise between two support bars and fastened by appropriately designed clamping pieces. In the space between the support bars, insulating spacers serve as additional support.

10 Claims, 3 Drawing Sheets

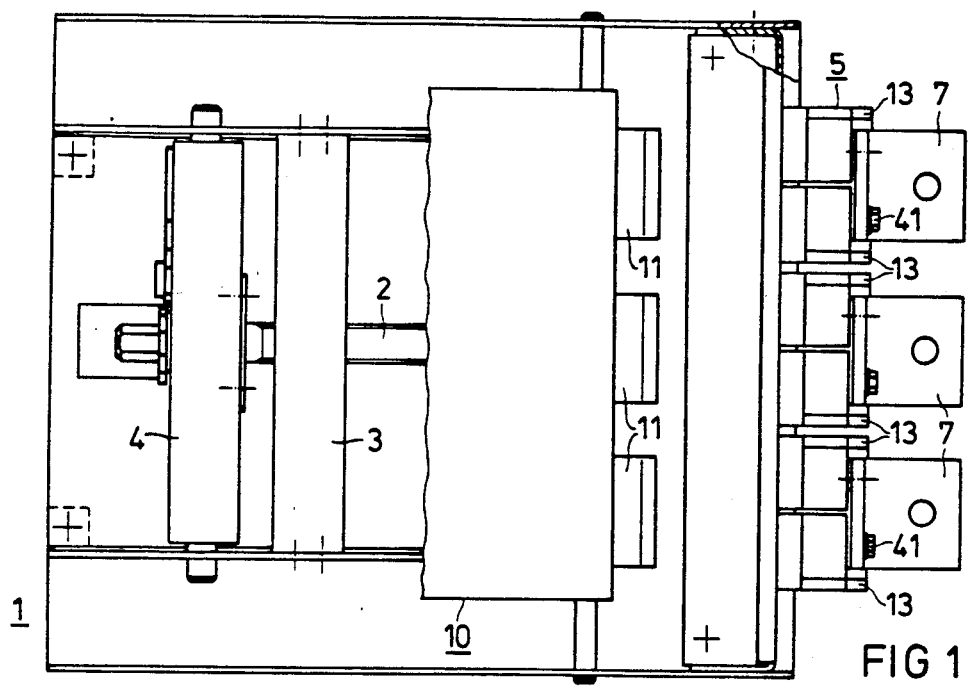
FIG 1
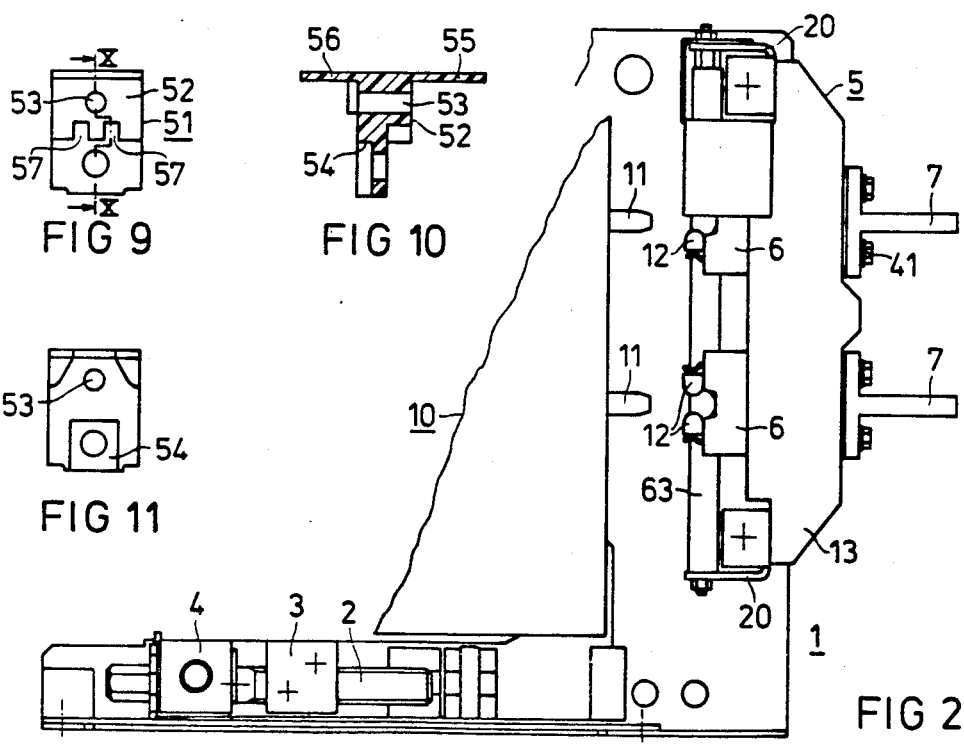
FIG 9
FIG 10
FIG 11
FIG 2

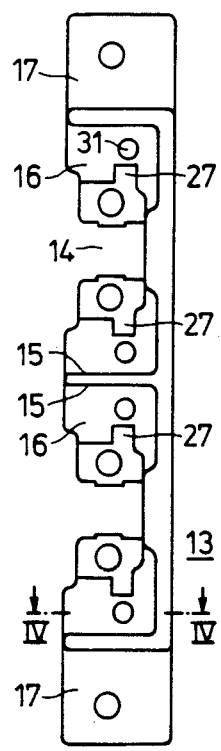
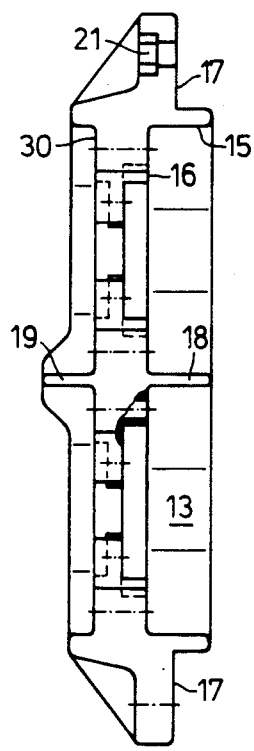
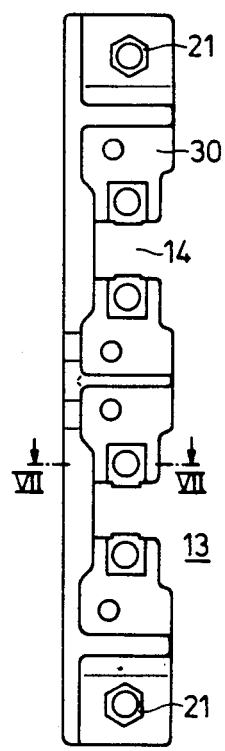
FIG 3　　FIG 5　　FIG 6
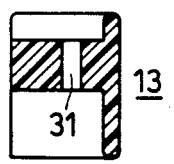
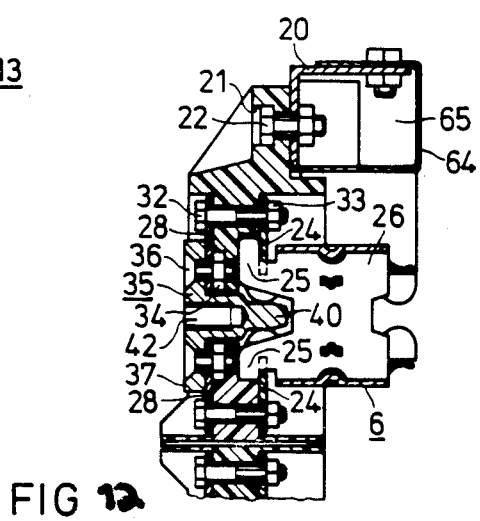
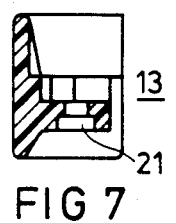
FIG 4　　FIG 12　　FIG 7

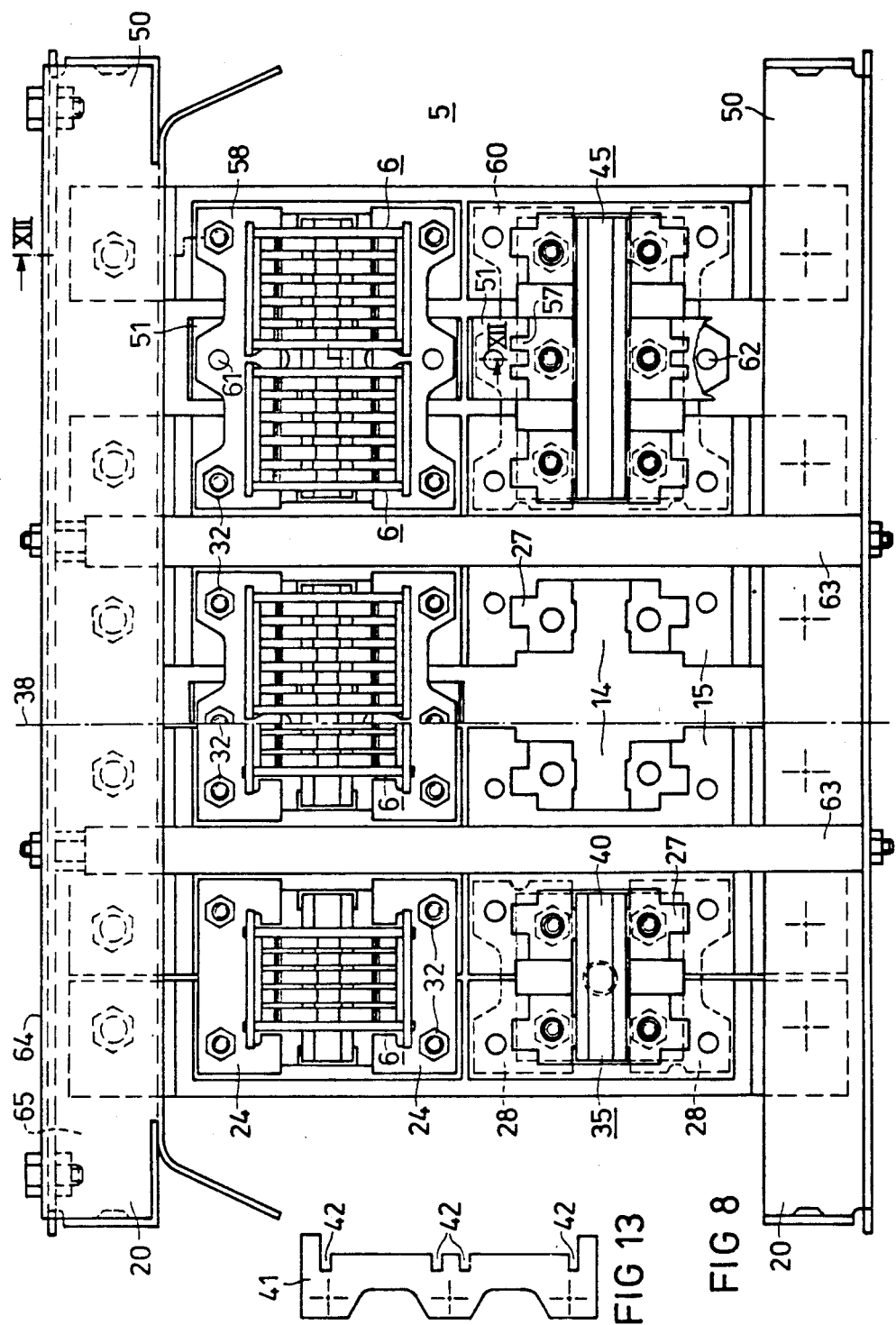

DISCONNECT CONTACT ARRANGEMENT FOR SWITCHGEAR MOVABLY ARRANGED AT GUIDES

BACKGROUND OF THE INVENTION

The present invention relates to a disconnect (break) contact arrangement for switchgear movably arranged at guides, wherein the switchgear comprises rigid conductor sections as connecting members and the guides comprise disconnect contact blocks fastened to insulating holders with limited mobility as counterpieces for the conductor sections.

A disconnect contact arrangement of this type has become known, for instance, from U.S. Pat. No. 2,128,149 or U.S. Pat. No. 3,308,348. The insulating holders and the disconnect contact blocks in that patent are parts which are individually fitted for a given type of switchgear. It is therefore necessary to keep in stock for switchgear with different current-carrying capacity and different dimensions, a disconnect contact arrangement designed accordingly so that several completely different disconnect contact arrangements are required for a switch series.

SUMMARY OF THE INVENTION

It is an object of the present invention to provide a disconnect contact arrangement which can be used for the differently designed switchgear of a series of switches and for this purpose can be put together in the manner of building blocks.

The above and other objects of the present invention are achieved by a disconnect contact arrangement for switchgear arranged movably on guides where the switchgear comprises rigid conductor sections as terminals and the guides comprise disconnect contact blocks fastened to insulating holders with limited mobility, the holder for the disconnect contact blocks of each pole of the switchgear being formed by two support bars receiving the disconnect contact blocks partially between them.

Thus, according to the invention, the holder for the disconnect contact blocks of each pole of the switchgear is formed by two support bars which accept the disconnect contact blocks partially between them. In contrast to a design of a holder, for instance, according to U.S. Pat. No. 3,308,348, the holder is always composed of two parts, whereby the possibility is created to use the same part of disconnect contact blocks of different size. Since furthermore the support bars are common for the disconnect contact blocks of a pole of the switchgear and the points of connection of the poles are on top of each other, an arrangement is obtained the width of which is variable in the same manner as the width of the switchgear changes within a series in the design for the rated currents of different magnitudes.

In addition to the reduction, achieved thereby, of the parts to be kept in stock, the advantage is obtained that the support bars as individual parts weigh less than the holders used to date and can therefore be manufactured without defects with less effort.

The support bar can comprise, for the disconnect contact blocks of a pole of the switchgear, one recess each partially accommodating the corresponding disconnect contact block. These recesses can be designed so that, for instance, a sufficiently large contact area for holding elements of the disconnect contact blocks is provided. In deviation therefrom it has been found to be advantageous to design the recesses of the support bars for always half the width of the disconnect contact blocks. In the standard design the space required for accommodating the disconnect contact blocks is then obtained by an immediately adjacent assembly of the support bars.

By itself, it represents a variance from the disconnect contact arrangements customary to date which are made individually for each switchgear, if the disconnect contact arrangements for a series of switches can be put together from only two types of support bars. According to a further embodiment of the invention, however, the support bars can be designed with central symmetry in such a manner that the disconnect contact blocks are received symmetrically between two equal support bars which are mounted aligned between two recesses facing each other. In this case, only one type of support bar is required, which can be used as the right as well as the left support bar.

In principle, the described support bars are suited for disconnect contact blocks of different designs. Particularly well suited, however, are disconnect contact blocks approximately in accordance with U.S. Pat. No. 4,486,636 of which the contact fingers arranged parallel to each other are arranged between side walls which have extensions serving for fastening. For fastening such disconnect contact blocks, the recesses of the support bars can have a deposition area, on which a clamping piece rests which is fastened to both support bars and which extends around projections of the lateral parts of the disconnect contact blocks. If a wider disconnect contact block is to be used, accordingly designed clamping pieces can be employed and thereby, the arrangement can be adapted to the differently designed disconnect contact blocks.

On the side facing away from the disconnect contact block, a further piece can be arranged which has a contact surface for a conductor section which is in conductive connection with the disconnect contact bar, and has fastening means for the conductor section. In this manner parts not only are connected to each other in an easy assembly operation, but a very strong arrangement is obtained which can stand large current forces.

If at least two disconnect contact blocks are to be arranged immediately adjacently in order to transmit a correspondingly large current, the same support bars can be used as are provided for an arrangement of single disconnect contact bars. In this case, the support bars can be arranged with corresponding spacing, and the mentioned clamping pieces can be designed for this spacing, insulating spacers being arranged in the space between the support bars and the clamping pieces. Also these spaces can be used as unified parts, so that disconnect contact arrangements with two, three or more disconnect contact blocks side by side can be made. It is advisable in this connection to tighten the clamping pieces and the spacers against each other by connecting means.

For all described modifications of the disconnect contact arrangement, an overall design is equally well suited, in which the support bars for the disconnect contact blocks or groups of disconnect contact blocks are fastened with their ends to a respective cross piece of the guides and in which support members connecting the cross pieces are arranged. In this case, great stability of the arrangement is obtained although it is only necessary to fasten the cross pieces with their ends to the guides.

BRIEF DESCRIPTION OF THE DRAWINGS

The invention will now be explained in more detail in the following detailed description with reference to the drawings, in which:

FIG. 1 is a top view onto a plug-in frame, shown simplified, for a low-voltage circuit breaker with one disconnect contact arrangement;

FIG. 2 shows the plug-in frame according to FIG. 1 in a broken off side view;

FIGS. 3 to 7 show different views and sections of a support bar. In these figures, FIG. 3 shows the (inner) side of the support bar facing the disconnect contact blocks;

FIG. 5 is a side view of the support bar;

FIG. 6 shows the the (outer) side of the support bar facing away from the disconnect contact blocks of the support bars. FIG. 4 is the cross section IV—IV in FIG. 3, while FIG. 7 shows the cross section VII—VII in FIG. 6;

FIG. 8 shows, on both sides of a center line, different embodiments of disconnect contact arrangements for a three-pole low-voltage circuit breaker where the terminals of each pole of the circuit breaker are associated with one disconnect contact block or two disconnect contact blocks;

FIGS. 9, 10 and 11 show a spacer in a view toward the side facing away from the disconnect contact block; a cross section as well as a view toward the side facing the disconnect contact blocks is shown;

FIG. 12 shows a section through a carrier with the disconnect contact block inserted, according to the line XII—XII in FIG. 8; and FIG. 13 shows an embodiment of a clamping piece.

DETAILED DESCRIPTION

The plug-in frame 1 shown in FIG. 1 is provided for installation into a switching system. It contains all parts which are required for a low-voltage circuit breaker 10 shown broken off so that the latter can be brought into a disconnect position. For simplification, not all parts required therefor are shown; shown, however, is a threaded spindle 2 with a nut 3 as well as a cross piece 4 which can be brought into connection with the housing of the circuit breaker. The plug-in frame 1 is a frame-like structure composed of sheet metal parts, the construction of which can correspond to a suitable type of design. On the back side of the plug-in frame 1 there is a disconnect contact arrangement 5 which comprises on its side facing the circuit breaker disconnect contact blocks 6 as well as terminals 7 on its side facing away from the circuit breaker. As can be seen from FIGS. 1 and 2, the disconnect contact arrangement 5 has two terminals 7 arranged on top of each other for each pole of the circuit breaker 10. A total of 6 terminals 7 are provided. For a different number of poles and/or two or more connecting points per terminal point of a pole, an accordingly larger number of connecting pieces may be provided.

The disconnect contact blocks 6 for each pole of the plug-in frame 1 cooperate with the rigid conductor sections 11 of the circuit breaker 10 and have, for this purpose, jumper contacts 12 movable against the spring force, as is described, for instance, in U.S. Pat. No. 4,486,636. The disconnect contact blocks 6 are fastened to holders which are formed by support bars 13. According to the three-pole arrangement, a total of six support bars 13 are therefore provided which can be seen particularly from FIGS. 1, 11, and 12. In a four-pole design, eight support bars 13 are accordingly used.

Details of the support bars 13 will be explained in the following, making reference to FIGS. 3 to 7. It can be seen from FIGS. 3, 5 and 6 that the support bars 13 are designed with central symmetry, and therefore can be used in an aligned arrangement as the right-hand as well as the left-hand support bar. Therefore, only this one type of support bar needs to be kept in stock for all designs of the disconnect contact arrangement. Such a part which can preferably be made of insulating plastic by injection molding, therefore has less weight than an insulating material part forming the complete holder and is therefore easier to make, and at the same time, the danger of manufacturing defects is reduced.

As is shown particularly in FIGS. 3 and 6, the support bars have recesses 14 corresponding to the spacing of the rigid conductor sections 11 of the circuit breaker 10, which are intended for letting the conductor sections pass through. The recesses 14 are always in the middle of an inner recess 15. As is shown particularly in FIGS. 5 and 13, each recess 15 has a deposition surface 16 which is used in a manner yet to be described for fastening the disconnect contact block 6. At the upper and the lower end, the support bars have a flat section 17 which serves for fastening the support bars to cross pieces 20 which can be seen particularly in FIGS. 1, 8 and 12. In order to facilitate the fastening operation, the end parts of the support bars 13 are provided on their outside for receiving the head of a hexagonal-head screw with a hexagonal depression 21 and an adjacent passage opening.

Further details of the disconnect contact arrangement can be seen from FIG. 8 which is divided by a dash-dotted line 38 into two different embodiments. According to the left part of FIG. 8, two support bars 13 each with recesses 14 facing each other are arranged immediately next to each other. Here, the support bars 13 are fastened by means of hexagonal-head screws 22 which are placed into the hexagonal openings 21, to an upper and a lower cross piece 20. This arrangement can also be seen from FIG. 12 in a cross section. The recesses 15 of the support-bars 13 supplement each other in such a way that a space for receiving respective disconnect contact blocks 6 is formed, as is shown in FIG. 8 in the upper part of the left pair of support bars 13 and in FIG. 12. The disconnect contact block 6 is held by clamping pieces 24, each of which extends over two upper and two lower projections 25 of side parts 26 of the disconnect contact parts 6 as can be seen particularly in the cross section according to FIG. 3. The clamping pieces 24 rest on the deposition surface 16 (FIG. 5) in the region of the edge of the recesses 15. By suitable design of the parts, provision is made that the disconnect contact block 6 can move slightly, in particular vertically, and that thereby, adaptation to the position of the conductor sections 11 of the circuit breaker 10 (FIG. 2) is achieved by only little force. For this purpose, pockets 27 for the projections 25 at the recesses 15 are provided.

While in the arrangement described above, the guidance of the disconnect contact blocks 6 is accomplished by the pockets 27, the guidance as well as the holding of the disconnect contact blocks 6 can be accomplished by clamping pieces 41 according to FIG. 13, which have cuts 42 for extending the lateral parts 26 of the disconnect contact blocks 6 in the manner of a comb. The projections 25 are then not needed or can be made smaller. The clamping piece 41 is designed for two disconnect contact blocks.

Further clamping pieces 28 which rest in outer recesses 30 (FIGS. 5 and 6) cooperate with the clamping pieces 24. Through holes in the clamping pieces 24 and 28 as well as through passage openings 31 of the support bars 13, screws 32 extend which serve as fastening means in conjunction with nuts 33. These screws can be used at the same time for connecting the terminals 7 (FIGS. 1 and 2) to conductor sections 35 (FIG. 12)

FIG. 12 shows that the outer clamping pieces 28 have inserted nuts 34 which serve for fastening conductor sections 35 by means of screws 36. The conductor sections 35 have a substantially plane outer surface 37 for attaching the terminals 7 shown in FIGS. 1 and 2, as well as an inner bridge 40 facing the corresponding disconnect contact block 6, as can be seen in FIG. 12. The conductor sections 35 are provided with tapped holes 42 so that a further terminal conductor can be fastened.

The embodiment of a disconnect contact arrangement shown in the left part of FIG. 8 has a disconnect contact block 6 for each terminal point of a circuit breaker, so that a total of six disconnect contact arrangements according to the right part of FIG. 8 are provided for a circuit breaker which, for the same vertical distance of the terminals 7, is designed for a larger rated current and consequently requires a conductor section 45 with a larger conductor cross section for the current transfer. To this end, each terminal is associated with two disconnect contact blocks 6 each instead of one disconnect contact block. Accordingly, the support bars 13 are fastened with a larger distance to cross pieces 50 which are likewise made longer. Here, each disconnect contact block 6 lies, in a manner completely agreeing with FIG. 12, in the recesses 15 of the support bars 13 with the projections 25 of a lateral part 26. For the adjoining connection of the projections 25 of the adjacent disconnect block 6 serves as an overlay spacer 51 according to FIGS. 9, 10, and 11 which will be explained in the following.

Each spacers 51 has a deposition surface 52 corresponding to the deposition surfaces 16 of the recesses 15 of the support bars 13, as well as a passage opening 53 for a clamping screw. Starting from the deposition surface 52, two pocket-like recesses 57 are provided next to each other for the projections 25 of the adjacent disconnect contact blocks. A further recess 54 is provided in order to make room for a nut corresponding to the nut 34 in FIG. 12. Each spacer 51 furthermore has an inner rib 55 and an outer rib 56. The height of these ribs is designed according to the height of ribs 18 and 19 separating the recesses 15 of the support bars 13 in order to create leakage paths as long as possible between voltage-carrying and grounded parts. Instead of the clamping pieces 24 and 28, there are provided in the example according to the right part of FIG. 8, wider clamping pieces 58 and 60 which have additional openings near the corners approximately in the middle, and a further opening 61 or 62 for clamping screws 32 going through the spacers 51. In this manner, an extremely stable arrangement is formed in spite of the greater distance of the support bars 13.

As is further shown in FIG. 8, there are, between the disconnect contact blocks or groups of disconnect contact blocks assigned to each pole, support members 63 which may be, for instance, threaded rods consisting of metal or profiled rods provided with threads at their ends. The support members 63 can be used in the same way in the embodiment according to the left or right part of FIG., 8, since the vertical distance of the cross pieces 20 and 50 is the same. By the support members 63, the overall arrangement is stiffened against the very large current forces (which occur particularly in the event of a short circuit) in such a manner that it is sufficient to fasten the cross pieces 20 and 50 at their ends to the plug-in carrier 1 according to FIGS. 1 and 2. Preferably, the support members 63 are provided with an insulating coating or are covered with insulating material.

The cross pieces 20 and 50 are designed as angular parts. If they are supplemented by angular or U-shaped profile sections 64 according to FIGS. 8 and 12 to form a closed profile, not only the bending stiffness of the arrangement is increased appreciably, but a canal 65 is also generated through which any desired auxiliary lines can be conducted from one side of the plug-in frame 1 to the other side in a protected manner.

In comparing the two embodiments according to FIG. 8, it is readily seen that essential parts of the arrangement and in particular, the support bars, the disconnect contact blocks and the spacers as well as the support members can be used also if a disconnect contact arrangement for a circuit breaker of another size is to be made, for which three contact blocks each per connecting point are required. In this case, only larger conductor sections with a profile corresponding to the profile of the conductor sections 35 or 45 and larger clamping pieces corresponding to the clamping pieces 57 and 60 in FIG. 9 are required.

In the foregoing specification, the invention has been described with reference to specific exemplary embodiments thereof. It will, however, be evident that various modifications and changes may be made thereunto without departing from the broader spirit and scope of the invention as set forth in the appended claims. The specification and drawings are, accordingly, to be regarded in an illustrative rather than in a restrictive sense.

What is claimed is:

1. A disconnect contact arrangement receiving a switchgear wherein the switchgear is arranged movably on guide means and wherein the switchgear comprises a plurality of rigid conductor sections for each pole of the switchgear comprising electrical terminals and further comprising disconnect contact blocks cooperating with the electrical terminals of the switchgear, the disconnect contact blocks associated with the terminals of the same pole of the switchgear being received partially between two insulating support bars so as to have limited mobility with respect to the electrical terminals of the switchgear for compensation of tolerances occurring between the electrical terminals and the disconnect contact blocks, the support bars being fastened to the guide means and wherein each support bar for the disconnect contact blocks of a pole has a recess partially receiving the corresponding disconnect contact block, and further wherein at least one inner clamping piece which rests on a deposition surface of said recess is fastened to both support bars engaging the lateral parts of a disconnect block.

2. The disconnect contact arrangement recited in claim 1, wherein the recesses of the support bars are half the width of the disconnect contact blocks.

3. The disconnect contact arrangement recited in claim 1, wherein the support bars have central symmetry such that the disconnect contact blocks are received between two support bars symmetrically, mounted aligned between two recesses facing each other.

4. The disconnect arrangement recited in claim 1, wherein the support bars are provided with pockets receiving projections at lateral parts of the disconnect contact blocks, and the clamping pieces cover the projections.

5. The disconnect contact arrangement recited in claim 1, wherein two clamping pieces are provided with cuts which extend over the lateral parts of the disconnect contact blocks in fork-fashion.

6. The disconnect arrangement recited in claim 1, wherein a further outer clamping piece is arranged on the side of the support bars facing away from the disconnect contact block, said outer clamping piece having a resting surface for a conductor section in connection with the disconnect contact block, and further having fastening means for the conductor section.

7. The disconnect contact arrangement recited in claim 1, wherein the support bars are arranged at an appropriate distance for receiving a group of two disconnect contact blocks arranged immediately adjacent and two clamping pieces are dimensioned for bridging said distance and insulating spacers are arranged in the space between the support bars and the clamping pieces.

8. The disconnect contact arrangement recited in claim 7, wherein the clamping pieces and the spacers are clamped together by connecting means.

9. The disconnect contact arrangement recited in claim 1, wherein the support bars for the disconnect contact blocks are fastened with their ends to a cross piece of the guide means and further comprising support members connecting the cross pieces arranged between the disconnect contact blocks of a pole of the switchgear.

10. The disconnect contact arrangement recited in claim 9, wherein each cross piece is designed as an angular piece and is supplemented to form a closed profile by a further angular or U-shaped profile section for increasing bending stiffness and for forming a wiring duct for electrical conductors.

* * * * *